(12) United States Patent
Kaya et al.

(10) Patent No.: US 9,560,399 B2
(45) Date of Patent: Jan. 31, 2017

(54) PERSONALIZED GENERATION OF WATCH LIST OF SHOWS IN A VIDEO DELIVERY SYSTEM

(71) Applicant: HULU, LLC, Santa Monica, CA (US)

(72) Inventors: Ilke Kaya, Marina Del Rey, CA (US); Devin Elston, Los Angeles, CA (US); Bangsheng Tang, Beijing (CN); Jinyu Yao, Beijing (CN); Heng Su, Beijing (CN); Mingkui Liu, Beijing (CN); Jordan Kolasinski, Culver City, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 14/738,376

(22) Filed: Jun. 12, 2015

(65) Prior Publication Data
US 2015/0365729 A1    Dec. 17, 2015

Related U.S. Application Data

(60) Provisional application No. 62/011,786, filed on Jun. 13, 2014.

(51) Int. Cl.
| | |
|---|---|
| *H04N 7/16* | (2011.01) |
| *H04N 21/25* | (2011.01) |
| *H04N 21/482* | (2011.01) |
| *H04N 21/262* | (2011.01) |
| *H04N 21/442* | (2011.01) |
| *H04N 21/658* | (2011.01) |
| *H04N 21/466* | (2011.01) |

(52) U.S. Cl.
CPC ...... *H04N 21/251* (2013.01); *H04N 21/26258* (2013.01); *H04N 21/44222* (2013.01); *H04N 21/4826* (2013.01); *H04N 21/6582* (2013.01); *H04N 21/4663* (2013.01)

(58) Field of Classification Search
CPC .............. H04N 21/44222; H04N 7/17318; H04H 60/43
USPC ............... 725/9–21; 709/219, 231, 232
See application file for complete search history.

(56) References Cited

U.S. PATENT DOCUMENTS

| | | | |
|---|---|---|---|
| 6,245,265 B1 * | 6/2001 | Chung | B29C 33/52 164/132 |
| 7,418,431 B1 * | 8/2008 | Nies | G06Q 10/06 702/2 |
| 7,593,921 B2 * | 9/2009 | Goronzy | G06F 17/30035 |
| 8,249,912 B2 * | 8/2012 | Elliott | G06Q 30/02 705/7.29 |

(Continued)

*Primary Examiner* — Annan Shang
(74) *Attorney, Agent, or Firm* — Fountainhead Law Group P.C.

(57) ABSTRACT

Particular embodiments provide a watch list of shows to users. The watch list is personalized for each user. Also, the watch list is dynamically organized to predict an order the user will want to watch the shows. Particular embodiments analyze historical user behavior with respect to the timing for recurring releases of the episodes for shows to determine the order of the shows in the watch list. The watch list is organized in a way that a user may select a "watch all" button where unseen episodes for the shows in the watch list are all played to the user in an order that is predicted to be the order in which the user would want to watch the shows. Providing the watch all button makes it important to predict the order of the shows accurately.

20 Claims, 11 Drawing Sheets

(56) References Cited

U.S. PATENT DOCUMENTS

| | | | | |
|---|---|---|---|---|
| 8,538,703 | B2* | 9/2013 | Kovatchev | A61B 5/14532 600/347 |
| 8,712,857 | B1* | 4/2014 | Adornato | G06Q 30/0207 705/26.25 |
| 8,938,758 | B2* | 1/2015 | Klarfeld | G11B 27/105 725/14 |
| 9,218,417 | B2* | 12/2015 | Eidesen | G06F 17/30864 |
| 9,288,519 | B2* | 3/2016 | Lee | H04N 21/26283 |
| 2003/0106058 | A1* | 6/2003 | Zimmerman | H04N 7/163 725/46 |
| 2003/0208755 | A1* | 11/2003 | Zimmerman | H04N 5/44543 725/34 |
| 2005/0090911 | A1* | 4/2005 | Ingargiola | G06Q 40/00 700/36 |
| 2007/0162440 | A1* | 7/2007 | Gutta | H04N 7/17318 |
| 2008/0301746 | A1* | 12/2008 | Wiser | H04N 7/17318 725/114 |
| 2013/0110803 | A1* | 5/2013 | Mikalsen | G06F 17/30867 707/706 |
| 2013/0136424 | A1* | 5/2013 | Fontan | H04N 5/76 386/296 |
| 2013/0204664 | A1* | 8/2013 | Romagnolo | G06Q 30/0203 705/7.32 |
| 2014/0053196 | A1* | 2/2014 | Selim | H04N 5/44 725/41 |

* cited by examiner

```
1: S := { all eligible shows }
2: (C, T, L) := divide S into three subsets according to the categories
above based on the user's history 3: P1 := with_next_unseen_episode(C|T|L)
4: P2 := without_next_unseen_episode(C)
5: P3 := without_next_unseen_episode(L)

6: G := group_by_category(sort_by_effective_time(P1))
// trailing and library shows treated as the same
// the groups should not change the original order
// e.g.: t, c, c, c, t, l, l, c, c, c, t becomes (t), (c, c, c), (t, l, l),
(c, c, c), (t)

7: for each group g in G
     sort_by_preference(g)
end for

8: Q1 := concatenation of the sorted groups in G
9: Q2 := sort_by_preference(P2)
10: Q3 := sort_by_preference(P3)

11: return Q1 + Q2 + Q3
```

FIG. 6

PERSONALIZED GENERATION OF WATCH LIST OF SHOWS IN A VIDEO DELIVERY SYSTEM

CROSS REFERENCE TO RELATED APPLICATIONS

The present disclosure claims priority to U.S. Provisional App. No. 62/011,786, entitled "Personalized List of Shows Generation", filed Jun. 13, 2014, the contents of which is incorporated herein by reference in its entirety.

BACKGROUND

Users have a variety of options to watch videos. For example, users can watch videos through a traditional cable television system. In this case, the television shows are released on a set broadcast schedule. A user can watch the television show when it airs. Users may also have various options to save shows to watch at later times. For example, a digital video recorder (DVR) may be set to record television shows when they are broadcast by the cable television system. The DVR may provide a list of the recorded television shows that are ordered by time. For example, the list orders the most recently recorded television shows on the top of the list.

Also, using on demand or streaming services, a user may select any video that is offered by the streaming service at any time. For the on-demand service, users may save videos into a queue. Similar to the DVR list, the queue may list the most-recently-saved videos first.

Other lists may also attempt to automatically populate a list of videos. For example, videos most recently watched by a user in the on-demand service may be added to a list. However, in all of the above situations, these lists are generally static. For example, the on-demand list does not change except when a user affirmatively changes the list or when a new video is added.

SUMMARY

In one embodiment, a method stores a watch history of shows for a user at a video delivery service that provides a service to send videos to a plurality of users. The shows release recurring episodes in a season on the video delivery service. A machine learning predictor is trained to determine selection probabilities for shows using the watch history of shows. The selection probability indicating a prediction the user will select the show to watch. The method receives a request for an episode of a show from a client device being used by the user and updates the watch history of shows with an indication the episode of the show was watched. A list of eligible shows is determined for the watch list based on the updated watch history of shows for the user. Then, the method receives user specific features for the list of eligible shows based on the updated user's watch history and inputs the user specific features and the list of eligible shows into the machine learning predictor to determine selection probabilities for each of the list of eligible shows. The selection probability indicates the prediction the user will select the show to watch. The watch list of shows is dynamically updated for the user based on the selection probabilities of the list of eligible shows, wherein the watch list of shows orders the shows in an order in which the selection probability predicts that the user will select the shows to watch unseen episodes of the shows.

In one embodiment, a method includes: receiving, by a computing device, a watch history of shows for a user at a video delivery service that provides a service to send videos to a plurality of users, wherein the shows release recurring episodes in a season on the video delivery service; determining, by the computing device, a list of eligible shows for a watch list based on the watch history of shows for the user; categorizing the list of eligible shows into a plurality of categories based on a current status of unseen episodes for shows in the list of eligible shows; determining, by the computing device, an effective time for each show in the list of shows, the effective time based on the category for each show; grouping, by the computing device, the list of shows into a plurality of groups based on the categories and the effective time for each show; receiving, by the computing device, user specific features for the list of eligible shows based on the user's watch history; for each group in the plurality of groups, inputting, by the computing device, the user specific features and the shows in a group into a machine learning predictor to determine a first order the shows in the group; and outputting, by the computing device, the watch list of shows in a second order based on the first order within the groups.

In one embodiment, an apparatus includes: one or more computer processors; and a non-transitory computer-readable storage medium comprising instructions, that when executed, control the one or more computer processors to be configured for: receiving a watch history of shows for a user at a video delivery service that provides a service to send videos to a plurality of users, wherein the shows release recurring episodes in a season on the video delivery service; determining a list of eligible shows for a watch list based on the watch history of shows for the user; categorizing the list of eligible shows into a plurality of categories based on a current status of unseen episodes for shows in the list of eligible shows; determining an effective time for each show in the list of shows, the effective time based on the category for each show; grouping the list of shows into a plurality of groups based on the categories and the effective time for each show; receiving user specific features for the list of eligible shows based on the user's watch history; for each group in the plurality of groups, inputting the user specific features and the shows in a group into a machine learning predictor to determine a first order the shows in the group; and outputting the watch list of shows in a second order based on the first order within the groups.

The following detailed description and accompanying drawings provide a better understanding of the nature and advantages of particular embodiments.

BRIEF DESCRIPTION OF THE DRAWINGS

FIG. 6 shows an example of pseudo-code for the watch list generator according to one embodiment.

DETAILED DESCRIPTION

Described herein are techniques for a system to generate a personalized watch list of shows. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a watch list of shows to users. The watch list is personalized for each user. Also, the watch list is dynamically organized to predict an order the user will want to watch the shows. Different from static releases, the watch list includes television shows that release new episodes on a recurring basis on a video delivery service. Predicting the order that a user might want to watch these shows may be different from lists that organize static releases (e.g., movies). Particular embodiments analyze historical user behavior with respect to the timing for recurring releases of the episodes for shows to determine the order of the shows in the watch list. The watch list is organized in a way that a user may select a "watch all" button where unseen episodes for the shows in the watch list are all played to the user in an order that is predicted to be the order in which the user would want to watch the shows. Providing the watch all button makes it important to predict the order of the shows accurately.

System Overview

Figure 1:
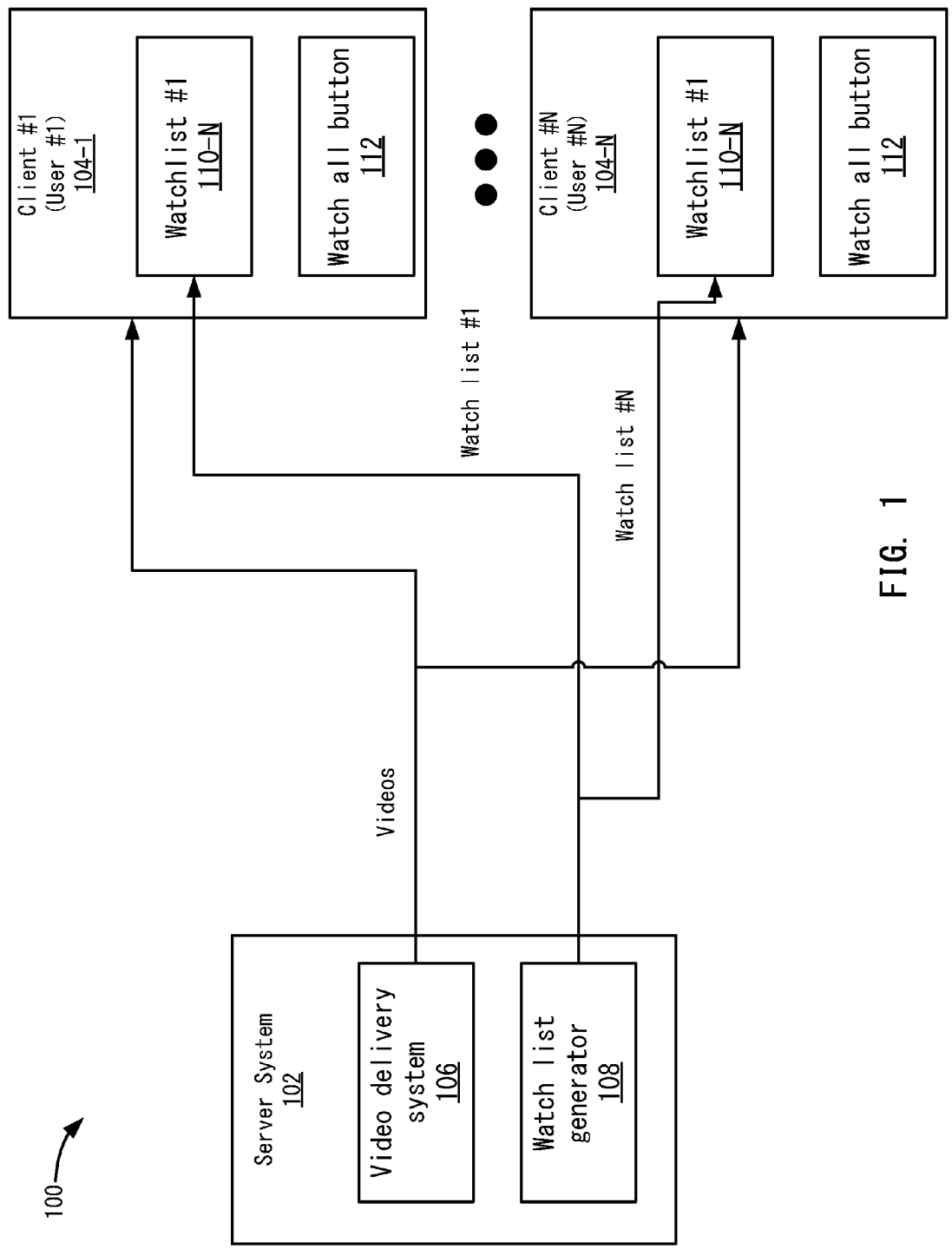
FIG. 1 depicts a simplified system for providing a watch list according to one embodiment.

FIG. 1 depicts a simplified system 100 for providing a watch list according to one embodiment. System 100 includes a server system 102 and multiple clients 104-1-104-n. Other components of a video delivery network may also be appreciated, such as content delivery networks, but are not shown. Also, server system 102 may include multiple servers and any number of clients 104 may be used.

A video delivery service may use a video delivery system 106 to provide videos on-demand to users using client devices 104. The video delivery service may include a video library of videos. Users may watch videos that are available in a video library through video delivery system 106 at any time. The video library includes different kinds of videos, such as movies, shows, shorts, clips, etc. The shorts and clips may be shorter versions or previews of movies or shows. Movies are released once while shows include episodes that may be released (or initially aired) on a set schedule during seasons. For example, the multiple episodes for the shows may be released daily, weekly, or on another schedule. Typically, the shows may be released seasonally, that is, a set number of episodes for a show may be released during a season, such as a four-month season during which an episode is released every week.

Shows including multiple episodes that are released over time in a set schedule are different from a video that is a static release, such as where movies are released once or where all episodes of a show are released at the same time. Once released, users can log onto the video delivery service and watch the newly released episodes. Different users have different habits when watching newly released episodes for different shows. Video delivery system 106 is configured such that the system can record a user's watch history when a user watches the episodes of shows. For example, a media player may send signals to video delivery system 106 as to what shows and episodes are requested/watched. From the signals, video delivery system 106 can determine a watch history for the user. The watch history describes what shows/episodes of the shows have been watched and when. For example, the watch history may indicate that a user has watched a show #1 on a certain date/time after an episode release and also watched a show #2 on a second date/time after an episode release. Because video delivery system 106 releases episodes for shows in a recurring manner, the watch history may provide valuable information that can be used to generate a watch list of shows for a user. For example, probabilities as to which episodes a user would prefer to watch may be determined using machine learning algorithms. These probabilities may then be used to predict what order a user will watch unseen episodes for shows.

A watch list generator 108 may determine the watch list for each user. Watch list generator 108 uses a user's watch history to determine a personalized order for the watch list. The order reflects a user's personalized viewing habits and preferences based on episode availability and timing information for when episodes are released. Watch list generator 108 may then provide a personalized watch list 110 to each user. When a user uses the video delivery service, a client 104 may display watch list 110 in an interface. For example, if a user #1 is using client #1, a personalized watch list #1 is displayed in a page for that user. For another user #N, client #N displays a personalized watch list #N for that user.

Watch list 110 may include shows in a predicted order that watch list generator 108 thinks the user will want to watch at a given time. Because watch list generator 108 attempts to predict this order, a "watch all" button 112 is provided to allow a user to watch all of the shows on the watch list with one selection of "watch all" button 112, and without further user input. Due to the emphasis on determining the correct order in which the user wants to watch the shows, "watch all" button 112 can be used effectively.

As discussed above, video delivery system 106 may provide shows that release episodes on a schedule. However, video delivery system 106 allows users to request the shows on-demand, such as once an episode for the show is released, the user may watch the episode at any time. This may be different from a user watching shows on a cable television system. In a cable television system, once the episode of the show is aired, the user cannot watch the show on demand unless it is offered on demand or the user recorded the show using the DVR. However, the cable television system may not receive an indication when a user watches the recorded shows on the DVR. But, for the video delivery system, the user needs to request the show from the service to watch the show. Also, a system that releases only single videos (e.g., movies) or all episodes for a show at once does not have the recurring timing information of when a user views released episodes week after week (or any other release schedule). Accordingly, the video delivery service has a unique situation when releasing episodes of a show and also being able to record when a user watched the episodes. Also, the shows released may be from a cable broadcast from content sources that then provide the videos to the video delivery service for release. The watching of the shows on the cable broadcast may not be related to the generating of the watch list on the video delivery service.

Due to the nature of the shows being offered by the video delivery service and different users' viewing habits, video delivery service can categorize the shows differently for each user. For example, the categories may include a current show, a trailing show, and a library show. A specific show may be assigned a different category for each user based on the user's watch history. Although the above categories are used, other categories may also be used.

The caught-up show may be a current show or a video delivery system original show. A current show may be where there are ≤1 next unseen episodes, and this show is currently releasing new episodes. For example, shows often run in seasons where episodes are released on a set schedule, such as every week, daily, twice a week, etc. Video delivery system 106 may determine whether a show is a current show using different methods. For example, a feature value may be set indicating the show is currently in season and releasing episodes. Or, video delivery system 106 uses thresholds to determine if a show is a current show if the show released an episode within a certain time or may receive broadcast schedule information to determine if the show is a current show. A current show is most often when a current episode has been recently released, such as within the last week or two and the show is currently releasing upcoming episodes, such as another new episode will be released in the upcoming week.

The next unseen episode is where the user has watched at least one episode (e.g., the latest released in the season) or all previous episodes, and then the next unseen episode was released and is after the latest seen episode, and has not yet been watched. The number of unseen episodes is measured from the latest watched episode of the season. Thus, a user may have skipped some episodes, such as the user watched episodes #1, #3, #4, and #6. There is an unseen episode #7 in this case. Also, the show is currently releasing upcoming episodes, such as within the next week, episode #8 will be released. The order of watching the episodes may also not matter. For example, if a user watched episodes #1, #2, #7, and #6 in that order, the next unseen episode is #8. Given typical release times are weekly, there may be a very short time period in which only one next unseen episode will be available if the user does not take any action to watch this episode. Also, a video delivery system original show that has a next unseen episode aired within seven days after the air date of the first episode of the same season. The video delivery system original show has episodes released in bunches or released all at once.

A second category is a trailing show category, which is a current show with ≥2 next unseen episodes. The trailing show is currently releasing current episodes, but the user has not watched two or more of the released episodes. The user may have watched at least one of the episodes or all of the previous episodes. The number of unseen episodes is measured from the latest watched episode of the season. Thus, a user may have skipped some episodes, such as the user watched episode #1, #3, #4, and #6. There are unseen episodes #7 and #8 in this case. Also, the show is currently releasing upcoming episodes, such as within the next week, episode #9 will be released.

A third category is a library show, which is a show that is not releasing current episodes at this time. The determination for determining whether a show is currently releasing episodes may be seasonal in which the season has ended and a new season with a new episode has not started yet. In this case, the library show may have all episodes of the season available. In one embodiment, video delivery system 106 may use a setting, a threshold, or broadcast schedule to determine whether a show is a library show or not. For example, if a show will not release a new episode for a period of time over a threshold, that show is a library show. Also, the broadcast schedule may be used to determine a season has ended.

As mentioned above, the same show may be categorized differently for each user depending on the status of the user's watch history. For example, a first show is a caught up show for a first user because that user has watched all of the released episodes, but the first show is a trailing behind show for a second user because that user has two unseen next episodes to watch. The different categorizations will affect the order of watch list 110 for different users in addition to the analysis of each user's specific watch history.

Once the shows are categorized, watch list generator 108 may generate the watch list 110. For example, watch list generator 108 uses a machine learning algorithm to predict the order of the shows in watch list 110. This process will be discussed in more detail below.

Interface and Watch List Example

Figure 2:
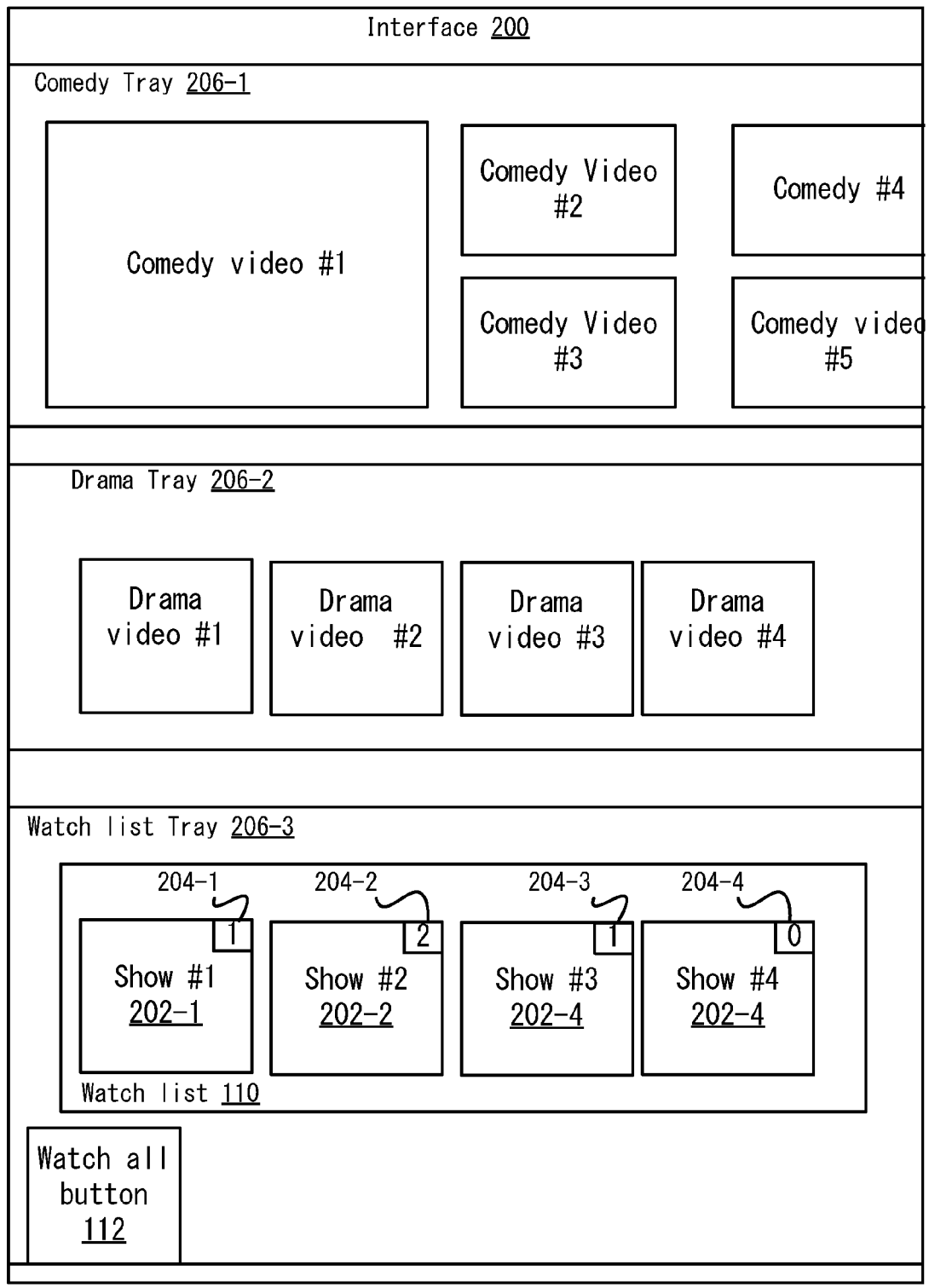
FIG. 2 shows an example of a watch list being displayed on a user interface of a client according to one embodiment.

FIG. 2 shows an example of a watch list 110 being displayed on a user interface 200 of client 104 according to one embodiment. Interface 200 may display different categories of videos from the video delivery service's video library. For example, different trays 206 are shown. In one example, a first tray 206-1 may show videos classified as comedies, a second tray 206-2 shows videos classified as dramas, and a third tray 206-3 includes watch list 110. Other trays may also be appreciated.

Watch list 110 includes icons arranged in a predicted order for shows. Also, tray 206-3 displays the "watch all" button 112 that plays all the shows in the predicted order. For example, at 202-1-202-4, shows #1-#4 are shown in an order from first to last. Other shows may also be included in watch list 110 after show #4, but are not shown. The shows may include a different number of available or unwatched episodes and indicators 204-1-204-4 indicate how many unwatched episodes each show includes. For example, an indicator 204-1 for show #1 indicates there is one unwatched episode, an indicator 204-2 for show #2 indicates there are two unwatched episodes, and an indicator 204-3 for show #3 indicates there is one unwatched episode. Indicator 204-4 indicates there are no unseen episodes for show #4. In one embodiment, show #1 may be listed first because it is a current show that has a single next unseen episode available. One reason why show #2 is shown before show #3 is that show #2 may be a trailing show in which episodes are currently being released for the show, but the user has not caught up with the unseen episodes. However, show #3 may be a library show in which only one episode has not been seen. Show #4 may be in any category, but has no unseen episodes so is listed at the end of watch list 110.

When a user selects watch-all button 112, video delivery system 106 will automatically play the next unseen episodes for all shows on watch list 110. For example, video delivery system 106 will play the next unseen episode for show #1 first. After the next unseen episode of show #1 is watched, video delivery system 106 will play the next unseen episode for show #2 followed by the second next unseen episode for show #2. Once the next unseen episodes of show #2 have been watched, video delivery system 106 plays the next unseen episode for show #3. Show #4 does not have any unseen episodes and thus the automatic watching of the shows may end. However, if other shows have unseen episodes, then those would be played after show #3. The above playing of the unseen episodes is performed without further user input after selecting watch all button 112.

Information Collection for Watch List Generator 108

Figure 3:
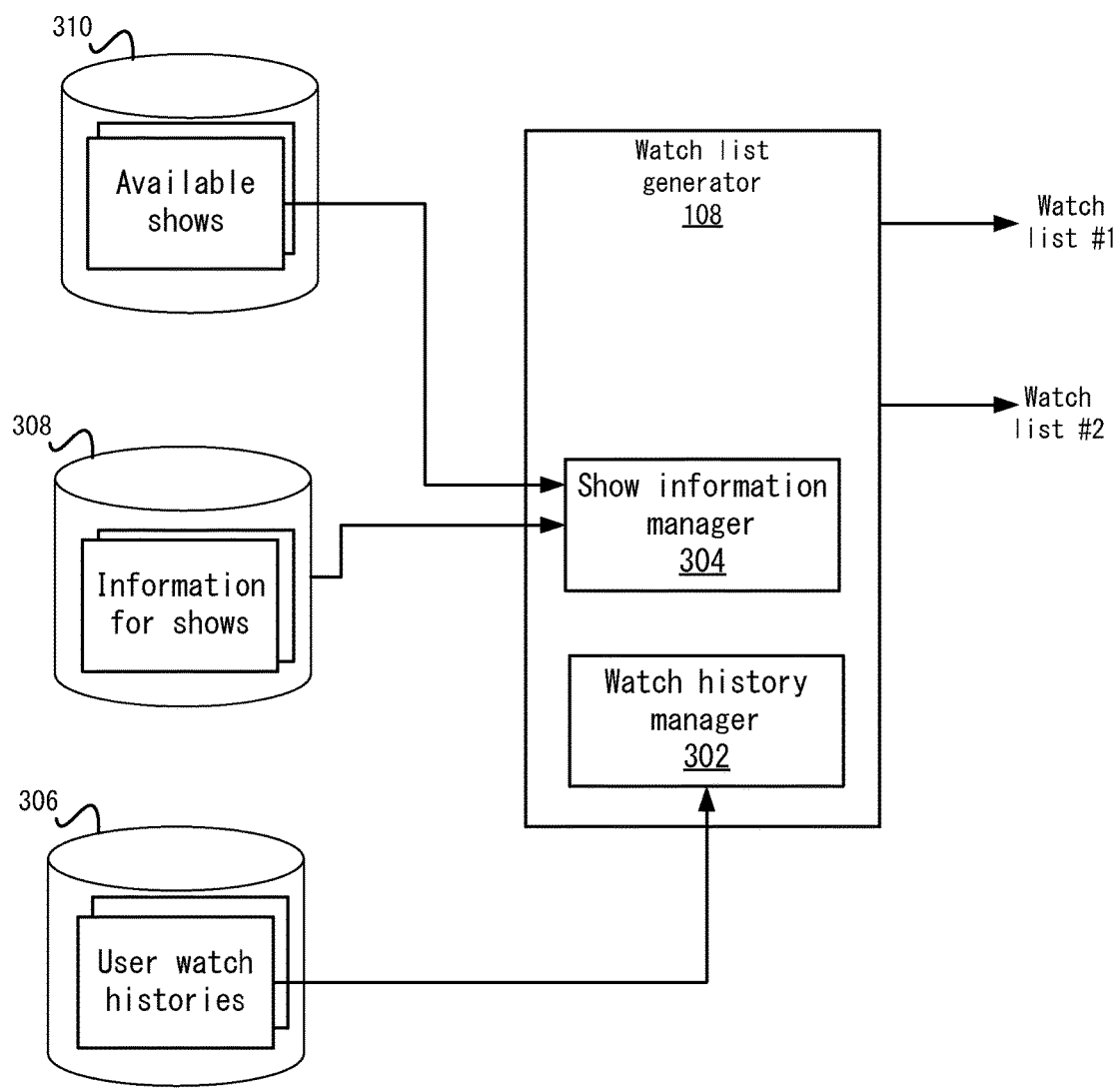
FIG. 3 shows a more detailed example of a watch list generator for retrieval of information to generate the watch list according to one embodiment.

Generation of watch list 110 requires a computer to calculate the order of the watch list accurately and efficiently. Each user's watch history must be analyzed to determine a specific user's preferences between shows. These preferences are used to predict the order of watch list 110. To predict the order, information for the users' watch histories and show related information need to be collected. FIG. 3 shows a more detailed example of watch list generator 108 for retrieval of information to generate watch list 110 according to one embodiment. Watch list generator 108 includes a watch list history manager 302 and a show information manager 304.

Watch list history manager 302 determines characteristics for a user's watch history. For example, because a user can request videos on-demand, the watch history for different users is different. For example, a user may watch different shows in different orders and/or times. Video delivery system 106 may store a watch history for all users in a database 306. Watch history manager 302 may extract values for relevant features for each user's watch list from each respective user's watch history in database 306. For example, some features may be the number of days since the user last watched the show, the number of times the user watched the show in the last week, month, 6 months, and/or N number of months, average watch latency from when an episode was released to actually watched, and fraction of times the show appears in the first, third, and/or other position of shows in a session. These features and others will be described in more detail below.

Show information manager 304 may determine relevant information for shows from a database 308. The relevant information may include timing information, such as whether a next unseen episode is available, whether a next unseen episode is available, became available in a last number (e.g., 3 or 4) days, number of days since the last episode was released, the season release interval, whether the show is a current show, and whether the show is a daily, weekly, or other interval show. These and other features will also be described in more detail below.

The video delivery service may have a list of available shows in a database 310 that could be included in watch list 110. The available shows may be those shows that are offered by video delivery system 106. In one embodiment, these shows may be shows that have multiple episodes. This may not include single releases, such as movies. However, in other embodiments, movies that a user has affirmatively saved or that may be recommended by the video delivery service may also be included as available shows.

Watch list generator 108 uses the show information and watch history for a user to generate watch list 110. For example, watch list generator 108 outputs watch list #1 for a user #1 and a watch list #2 for a user #2. These watch lists are different for different users. Because each watch list is dynamically determined and personalized for users, watch list generator 108 needs to be implemented using a computing device operating a machine-learning algorithm. This process cannot be performed manually due to the many inputs that need to be taken into account to predict a user's preference for watching one show over another. Also, dynamic changes need to be made to watch list 110 for the list to be accurate and the watch all button to work. For example, when a user watches one of the videos on watch list 110, watch list generator 108 must dynamically regenerate the watch list 110 to reflect the viewing of an episode. For example, if a show changes from a trailing show to a caught up show, then the show could be moved to a different position in watch list 110. Also, once a show has had all the currently released episodes watched, then the show should be moved down in the order. Further, a user's viewing preferences may change to prefer one show over another, which would change the predicted order. If these changes are not dynamically applied, the watch all button will not have all the unwatched episodes in the correct predicted order.

Overall Method Flow

Figure 4A:
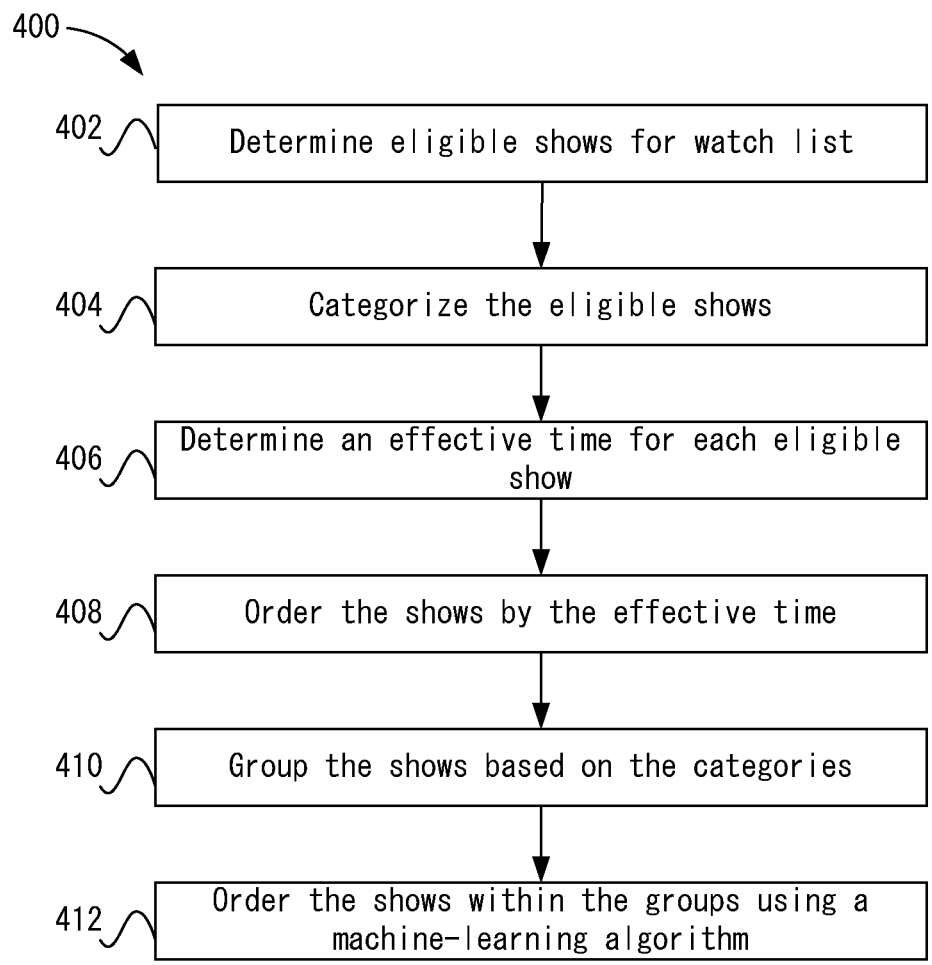
FIG. 4A depicts a simplified flowchart of a method for determining the watch list according to one embodiment.

One method for generating watch list 110 will now be described. FIG. 4A depicts a simplified flowchart 400 of a method for determining watch list 110 according to one embodiment. It will be recognized that other methods may also be used. At 402, watch list generator 108 determines eligible shows for watch list 110. For example, eligible shows may be determined based on the watch history of a user. The watch history may indicate shows that have recurring episodes that have been watched previously by a user. Also, some eligible shows may have been explicitly saved by a user, and may not have been watched yet. Further, the video delivery service may determine recommended shows that a user has not watched yet based on the user's watch history. In one embodiment, a show is eligible for watch list 110 when the user has watched ≥1 episode, or ≥5 clips of a show. An episode is a full episode of the show released on a certain date. A clip may be a shorter version of the episode, such as a portion of the video, or a preview for the episode.

At 404, watch list generator 108 then categorizes the eligible shows. The categories may include a caught-up show (C), a trailing show (T), and a library show (L). Any shows that do not have any unseen episodes may be categorized in the caught-up show category if the show is currently releasing new episodes, or in the library show category if the season is over and the show is not currently releasing episodes.

At 406, watch list generator 108 determines an effective time for each eligible show. The effective time may be defined differently based on the category of the show. For example, for caught-up shows, the release time of the next unseen episode or the incomplete watch time of this episode, whichever is later, may be the effective time. In one embodiment, the release time may be the time in which the episode was released by video delivery system 106. In another embodiment, the release time may be the release time in which the show episode was released in a broadcast, such as in a network TV broadcast schedule. For example, a television show #1 may be released in a television broadcast on Tuesday at 8:00 p.m. Eastern Standard Time. This may be the effective time. In another embodiment, video delivery system 106 may release the episode on Wednesday at 8:00 p.m., and this may be the effective time. The watch time may be the time that the user watched the latest episode. In this case, if a caught-up show only has one unseen episode, this is either an unseen next episode or an episode that was partially watched. Also, the caught up show may not have any unseen episodes in which case no effective time may be used. These shows may be ranked lower than shows with unseen episodes and ranked by the machine learning predictor. For trailing and library shows, the watch time of the latest episode by release time may be used.

At 408, watch list generator 108 orders the shows by the effective time. For example, the shows are ordered from the latest effective time to the earliest effective time. The latest effective time may be the most recent effective time from the present time, and the earliest is the further in the past.

At 410, watch list generator 108 may group the shows based on the categories. For example, the caught up shows may be one grouping level, and the trailing and library shows may be treated the same in another grouping level. However, each category may also be a different level. The grouping may group consecutive shows in the same category from the ordering by effective time. For example, if the notation C, T, and L is used to represent shows, a pre-sorted list by effective time from latest to earliest is T,C,C,C,T,L, L,C,C,C,T. From the grouping, the following subsets will be created: (T), (C,C,C), (T,L,L), (C,C,C), (T), where groups are in parentheses. In the above, groups were formed by consecutive shows with the same category level. In the above order, some caught up shows may be listed behind library shows because the caught up shows do not have any unseen next episodes.

After grouping the shows, at 412, watch list generator 108 orders the shows within the groups using a machine-learning algorithm. The machine-learning algorithm is needed to learn the preferences of a user based on the watch history and features of the shows. This may learn the user's preference between shows. The higher a show is ranked in the subset, the more likely the user is predicted to watch that show at that moment in time. At 414, once the list is generated, watch list generator 108 sends watch list 110 to a client 104 for the user.

As discussed above, the user may provide a single input and watch episodes on the list automatically. For example, watch all button 112 is provided on an interface that is displaying watch list 110. When a user selects watch all button 112, each show in the personalized list is played in the order in which the list has sorted them. In this case, if a first show has multiple episodes, the unwatched episodes for the first show are played automatically, and then all unwatched episodes for the second show are played. In other embodiments, if episodes are sorted, then episodes for different shows may be played in the order in which they are sorted.

In the method described above, particular embodiments use rules to categorize the eligible shows first and order them by effective time, and then the machine-learning algorithm may be used to predict the final order. In other embodiments, the machine-learning algorithm may just be used without applying rules to the eligible shows. In this case, the categorization and effective time may be used as inputs to the machine-learning predictor to order and group the shows. That is, the categorization and effective time may be used as features to the machine-learning algorithm.

Figure 4B:
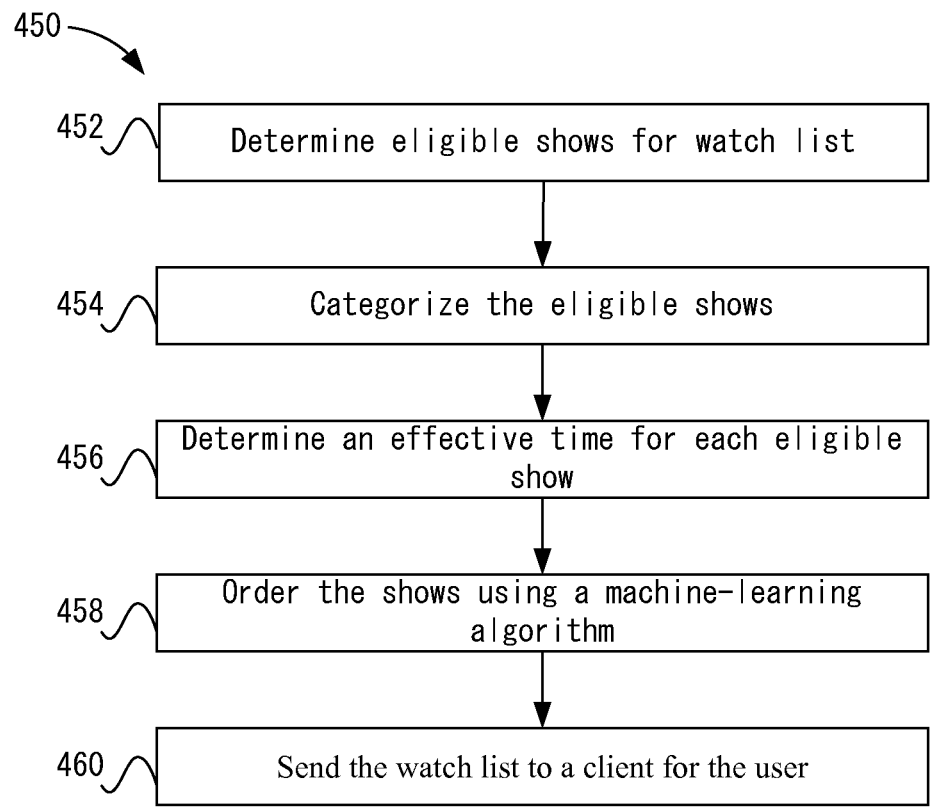
FIG. 4B depicts a simplified flowchart of another method for determining the watch list 110 according to one embodiment.

FIG. 4B depicts a simplified flowchart 450 of another method for determining watch list 110 according to one embodiment. It will be recognized that other methods may also be used. At 452, watch list generator 108 determines eligible shows for watch list 110.

At 454, watch list generator 108 then categorizes the eligible shows. The categories may include a caught-up show (C), a trailing show (T), and a library show (L) as described above.

At 406, watch list generator 108 determines an effective time for each eligible show. The effective time may be defined differently based on the category of the show as described above.

At 458, watch list generator 108 orders the shows using a machine-learning algorithm. The machine-learning algorithm may use the effective time and categories as features to order the list. For example, the features could include an EffectiveTime feature for effective time, an IsTrailing feature for whether the show is a trailing show or not, and a Category feature for the category of the show. If enough user behavior is collected, the training of the machine-learning algorithm will choose the correct features for prediction. In the case of decision tree, particular embodiments could also enforce the first few layers to use categories/effective time related features. At 460, once the list is generated, watch list generator 108 sends watch list 110 to a client 104 for the user.

As discussed above, the user may provide a single input and watch episodes on the list automatically. For example, watch all button 112 is provided on an interface that is displaying watch list 110. When a user selects watch all button 112, each show in the personalized list is played in the order in which the list has sorted them. In this case, if a first show has multiple episodes, the unwatched episodes for the first show are played automatically, and then all unwatched episodes for the second show are played. In other embodiments, if episodes are sorted, then episodes for different shows may be played in the order in which they are sorted.

Machine Learning Process

Figure 5:
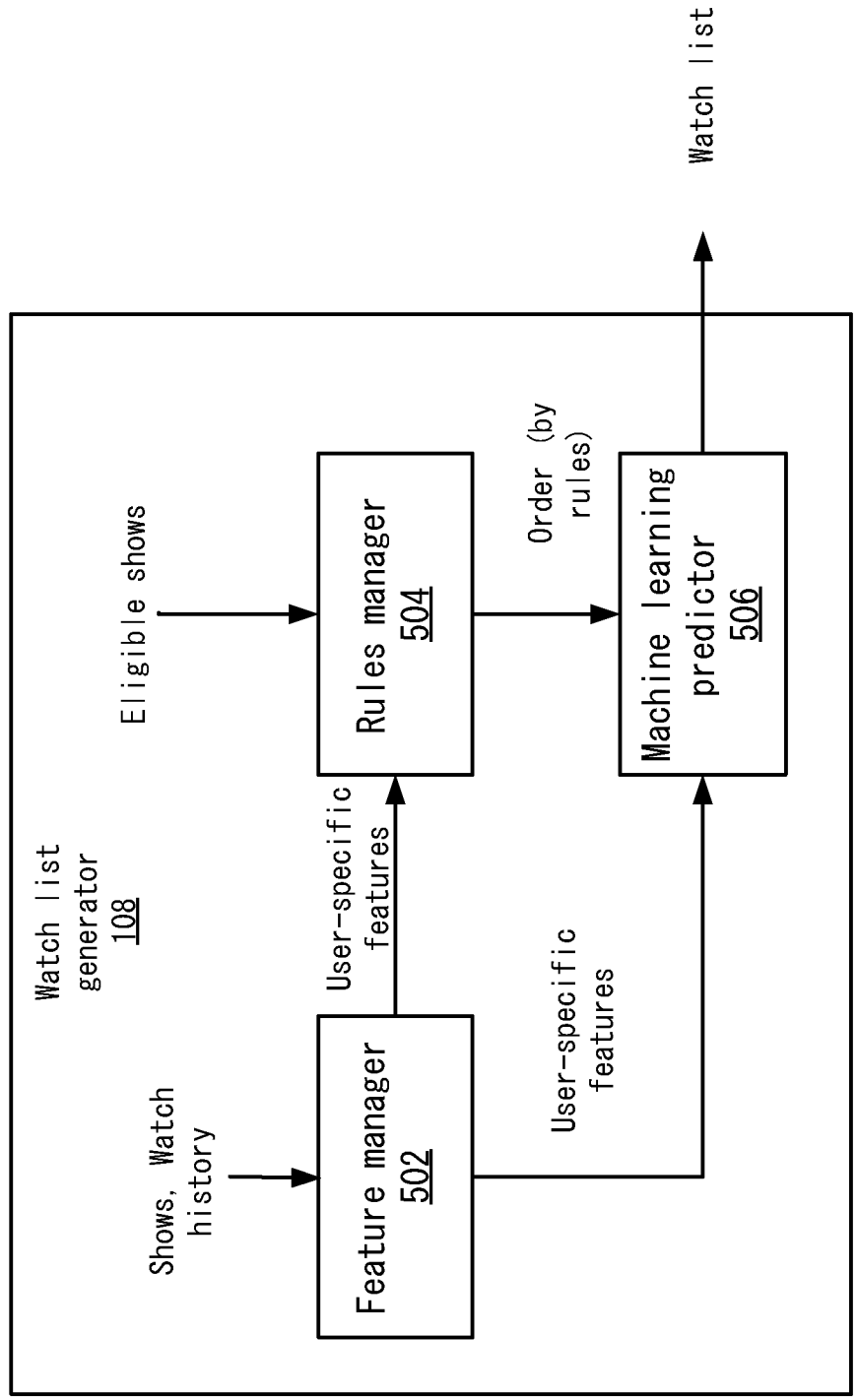
FIG. 5 shows a more detailed embodiment of the machine-learning process according to one embodiment.

FIG. 5 shows a more detailed embodiment of the machine-learning process according to one embodiment. A feature manager 502 determines feature values for either the rules or the machine-learning predictor 506. Feature manager 502 may receive the eligible shows and watch history for a user and determine applicable feature values. A more detailed example of these features will be described below. A rules manager 504 receives identifiers for the eligible shows and also the applicable user-specific feature values needed for the rules. Rules manager 504 can then apply the rules to the eligible shows using the feature values. For example, the rules order the shows by effective time and into categories.

Machine-learning predictor 506 receives the categorized for the eligible shows and the applicable feature values for a user. Machine-learning predictor 506 can input the shows and the feature values into a machine-learning algorithm that is trained based on previous feature values received from feature manager 502. Machine-learning predictor 506 then outputs the order for the watch list.

Machine-learning predictor 506 may use various features that may be determined from the user's watch history or the show characteristics. Table 1 shows an example of features that could be used.

TABLE I

| Feature Name | Description | Range |
|---|---|---|
| Availability | Whether next unseen episode is available | {0, 1} |
| AvailabilityTurn | Whether next unseen episode became available in last three days | {0, 1} |

TABLE I-continued

| Feature Name | Description | Range |
|---|---|---|
| LastReleaseInterval | Number of days since latest episode was released | [0, +∞) |
| NewSeasonReleaseInterval | Number of days since the latest season was released | [0, +∞) |
| ViewCount | View count of this show in the past 6 months | [1, +∞) |
| MonthViewCount | View count of this show in the past month | [0, +∞) |
| WeekViewCount | View count of this show in the past week | [0, +∞) |
| TimeNoSee | Number of days since the user watched this show the last time | [0, +∞) |
| IsCurrentShow | Whether this show is a current show | {0, 1} |
| IsDailyShow | Whether this show is a daily show | {0, 1} |
| AverageWatchLatency | Average number of days between an episode released and watched | [0, +∞) |
| TopOneInSessions | Fraction of this show appearing in the first position of the sessions | [0, 1] |
| TopThreeInSessions | Fraction of this show appearing in the first three positions of the sessions | [0, 1] |

In table I, {0, 1} means either 0 or 1, [0, 1] means the range from 0 to 1 inclusive, [0, +∞] includes 0 but not +infinity. All the features are defined from behaviors of a specific user for a specific show. The following features characterize the show, the user, and the relation in terms of availability, engagement, recency, show attributes, and view patterns.

The Availability feature indicates whether the next unwatched episode is available, which may be a value of 0 if the next unwatched episode is not available and a value of 1 if the next unwatched episode is available. Availability conforms with a time point of the feature extraction for training or scoring purposes. The next unwatched video in the Availability feature is the next episode if the user has completed one or more episodes, or a clip or trailer released after an episode the user watched. The AvailabilityTurn feature is whether the next unwatched episode became available in the last three days, and this value may be 0 or 1.

The LastReleaseInterval feature may be the number of days since the last episode of the show was released. For the LastReleaseInterval feature, the latest release may only be an episode if the user has only watched episodes, or may be a clip, a trailer, or an episode if the user has watched any clip or trailer.

The NewSeasonReleaseInterval feature may be the number of days since the last season was released. This may be the last episode that was released in the last season. For the NewSeasonReleaseInterval feature, the last season was released at the release time of the first episode of the latest season from which the user has not watched any episode and the user has watched one or more episodes from an older season. The value may be an infinitely far feature instead of defaulting to infinity if the user is caught up with all the episodes. Presumably, the smaller this value is, the more likely the user is going to watch this show.

The ViewCount feature is the number of times this show has been viewed by a user in a certain time frame, such as 6 months. The MonthViewCount feature is the view count for this show in the last month, and the WeekViewCount feature is the view count for this show in the last week. The ViewCount feature is more informative than overall popularity among multiple users because each user's experience is personalized in the ViewCount feature. The MonthViewCount feature and WeekViewCount feature also give different granularities of view counts that are personalized to each user.

The TimeNoSee feature is the number of days since the user last watched this show. The lower the TimeNoSee value, the most likely a user might watch the show.

The IsCurrentShow feature is whether or not this show is a current show, that is, the show is currently releasing episodes. The IsDailyShow feature indicates whether this show is a daily show, that is, shows are released every day. These features may be set manually or automatically determined.

The AverageWatchLatency feature is the average number of days between when a video is released and a user actually watches the video. The AverageWatchLatency feature may quantify the eagerness to watch the newly-released episodes. The smaller the latency is, the more eager the user is.

The TopOneInSessions feature is the fraction of this show appearing in the first position when a session starts by the user. The TopThreeInSessions feature is the fraction of this show appearing in the first three positions of sessions. In the TopOneInSessions feature, a watch session is a series of consecutive video views within intervals, such as less than five hours. Every users' watch history can be divided into several watch sessions. For example, if a user watches show A before show B, then presumably show A would appear significantly more frequently in the first view positions in sessions than show B. In the TopThreeInSessions feature, if a user watches show A before show B, then presumably show A would appear significantly more frequently in the first three view positions in sessions than show B.

Other features may also be used. For example, a SameWeekDayViewCount feature may be the frequency of the user watching a show at the same weekday within a certain time period, such as 60 days. Also, a SamePeriodViewCount feature may be the frequency of the user watching this show at the same time of the day within a certain time period, such as the last 30 days, and the time of the day may be within a threshold, such as in one hour. Further, the categorization of the shows and effective times may be features.

When given a user, a show and some related features, machine-learning predictor 506 calculates a real number, usually ranging from 0 to 1, indicating the probability the user will click the show in the personalized list of shows. And then, the shows are sorted in descending estimated probabilities of watching.

Mathematically, machine-learning predictor 506 uses a function $f(u, s)$, for a given user u, and show s, such that $f$ is consistent with ground truths as much as possible. The ground truths may be user behavior information collected as training data, such as watch behavior (timestamped) and click/load behavior of the watchlist. Note that all the aforementioned features at a certain time point can be calculated using the history and video metadata at that point. For the computation of such a function, ground truths or training data are prepared from implicit user feedbacks: video views, loads/clicks on the personalized list of shows. For example, if a user's clicks on the watchlist tray are clicks C1, C2, . . . , Cn, and at times t1, t2, . . . , tn, correspondingly. For each click Ci, particular embodiments calculate the features at time ti (using the history H up until ti). Let s be the clicked show, and s' any other show that is shown in the watchlist, but not clicked at time ti. A positive instance is generated for s, and negative instances are generated for each s'. Specifically, the machine learning predictor wants the function $f(u, s)=1$, interpreted as a user with a history H, will click on show s, while the shows shown but not clicked are labeled as negative, that is for each such a show s', machine-learning predictor 506 would like $f(u, s')=0$. In this manner, multiple instances are generated from a user's history. The ground truths are the instances from all users' history combined. The purpose of the training procedure is to find a function $f$ that is mostly consistent with ground truths. The training procedure also automatically chooses features that will be used and determine how important each feature is. Information associated with a user and a show is encoded in a real-valued feature vector, the computation of which requires no more than the user's watch history.

The algorithm computes a model that fits the ground truths the best. Particular embodiments may use a decision tree model trained with an algorithm, such as C4.5. The model is non-linear such that it is capable of expressing sophisticated combinations of different features. The standard measurement area under curve (AUC) is employed to select among models, choose parameters and measure the quality of the resulting model. Each node of the decision tree may evaluate a feature described above. For example, after the training process, the machine learning predictor has a function f. For a user u (along with his/her history) and a show s, f(u, s) will output a real value in [0,1]. The shows in the Watchlist for the user u, will be ranked according to the values output by the function f. Other algorithms may also be used, however.

The following describes high-level goals for the machine-learning predictor. Machine-learning predictor 506 may implement the goals using a model. The goals may be embodied by the rules or alternatively learned by the machine learning predictor.

In a goal #1, if show A and show B are both current shows that the user is caught up with, then perform:
  (a) if show A has a new episode available and show B does not have a new episode available, then machine-learning predictor 506 ranks show A higher than show B. This should be captured by the Availability feature, and is enforced in the current implementation by a rule. This is related to the definition of Caught-up shows.
  (b) if both show A and show B have new episodes available and they are current shows based on the Availability feature and the IsCurrent feature, then:
    i. if there is enough historical watch history data to determine that the user explicitly watched show A before show B when they both had new episodes based on the Top3InSession and Top1InSession features, then machine-learning predictor 506 should list show A before show B.
    ii. Otherwise, machine-learning predictor 506 determines the order based on implicit signals of the user's affection, such as using the ViewCount feature, to the show. One signal may be the average time between the episode being available and watched by the user, such as the AverageWatchLatency feature, with a weight that decays over time.
  (c) If neither show A nor show B has new episodes available, apply the same factors as in (b).

In goal #2, if both show A and show B are current shows, and the user is caught up with show A and is trailing behind (e.g., last 2+ episodes unwatched) on show B, then perform:
  (a) if show A does not have a new episode based on the Availability feature, machine-learning predictor 506 should list show B before show A.
  (b) Otherwise, machine-learning predictor 506 should predict show A should be before show B.
    i. After this, if a user watches show B while show A still has a new episode available, machine-learning predictor 506 should predict that show B should be listed before show A. This is because the user may be showing a new affection to show B. If the user does not watch the new episode of show A before the next episode airs, show A becomes a trailing behind current show. Show A is then re-categorized.
  (c) The order that the user watches show A and show B should not count toward the explicit signal described in goal #1 until the user catches up with both shows (in which case goal #1 will apply). The preference might change once the user catches up with both shows.

In goal #3, if show A and show B are both current shows where the user is trailing behind (e.g., the last 2+ episodes are unwatched), then perform:
  (a) If machine-learning predictor 506 learned an explicit preference between show A and show B earlier, and show A and show B have not been watched for a similar amount of time within a threshold, machine-learning predictor 506 may sort by the explicit preference.
  (b) Otherwise, machine-learning predictor 506 may list the show that was last watched by the user first.
  (c) New episodes of show A should not change their ranking in the list. This is because these shows are trailing behind shows.

In goal #4, for library shows versus everything else, replace "current show trailing behind" with library in all the requirements above. That is, the library show is treated the same as a current show trailing behind. Some points are as follows:
  (a) The one difference is that the library shows will not fall under the current shows that the user is caught up with category once the user has watched all shows in the library shows.
  (b) A "new season" case will be covered automatically as library shows will become current shows with a new episode.
  (c) The "watch again" case will be covered automatically as current shows that a user is trailing behind in and library shows are sorted by recency, and this show type will be listed as having no next unseen episode.

Machine-learning predictor 506 may also adhere to the following principles and scenarios. For content availability, the probability of users watching shows with unwatched episodes may be higher than the probability of users watching shows they are already caught up with. Machine-learning predictor 506 may treat all unwatched episodes aired before the latest watched episode as watched during the sorting.

For affection, the more machine-learning predictor 506 determines the user likes a show, the probability of the user watching it may be higher. Machine-learning predictor 506 may use the average time between the episode airing and being watched by the user as a predictor.

Machine-learning predictor 506 uses the Availability feature to determine whether there is a next unwatched video available. Machine-learning predictor 506 may determine the probability of a user watching a show with an unwatched episode may be higher than the probability of a user watching a show that does not include any available unwatched episodes. Machine-learning predictor 506 may treat all unwatched episodes aired before the last watched episode as being watched.

Machine-learning predictor 506 may use the ViewCount, MonthViewCount, and WeekViewCount features to determine the affection to a show for a user. For example, the more the user views a show in the last week, month, and past six months, machine-learning predictor 506 may determine the probability of a user watching the show may be higher. Also, machine-learning predictor 506 may use the AverageWatchLatency feature between the time the episode aired and when it was watched by the user to determine the affection probability.

Machine-learning predictor 506 may also use the recent behavior of the user to determine the probability of the user's future actions. For example, the weight of the signal mentioned in the affection scenario could decay over time. Also, machine-learning predictor 506 may capture the binge-watching of library shows. This is when a library show has already released all of its episodes and a user watches those episodes in a short period of time.

Machine-learning predictor 506 may also use explicit preference to determine the probability of a user watching a show may be higher than other shows. For example, machine-learning predictor 506 may use the watch history to determine when a user explicitly picked a show A over a show B when both shows are in the same category. For example, if the user historically watched a show before other shows when the shows both had new episodes available, machine-learning predictor 506 may determine the probability of a user watching that show is higher than the other shows. This may apply only to current shows that the user is caught up with, that is, a new episode arrived after the user watched the latest episode. For example, show A airs on Wednesdays, and show B airs on Thursdays. The user logs into the video delivery system on Friday and watches show A before show B. Although the AverageWatchLatency feature for show B is lower, machine-learning predictor 506 may predict that the user clearly prefers show A over show B due to the explicit preference in the user's watch history. Machine-learning predictor 506 may predict that the user has a higher preference for show A than show B when both shows have new episodes available.

Machine-learning predictor 506 may predict that a new current episode is greater than a library episode. For example, the probability of a user watching a current show with a new unwatched episode (or season) may be higher than the probability of an episode from a library show. This may only apply if the new episode arrived after the user has caught up with the show. Otherwise, machine-learning predictor 506 may determine that a trailing behind current show is equal to a library episode. New episodes airing in current shows that a user is trailing behind may not increase the probability of the user watching that show. Machine-learning predictor 506 may use the watch history of a user to determine when current shows become trailing behind shows.

Watch List Generator Example

FIG. 6 shows an example of pseudo-code for watch list generator 108 according to one embodiment. Although this algorithm is shown, other algorithms may be used. The input for watch list generator 108 is a user U together with a watch history H. The user U may be an identified user along with the watch history for that user. The output of watch list generator 108 may be an ordered list of shows for the watch list. In line #1, variable S is populated with all eligible shows based on the watch history H. In line #2, the shows S are divided into three subsets according to the categories based on the watch history H. The categories may be a current show C, a trailing-behind show T, and a library show L. The categories may be determined based on the user's watch history H and the Availability feature, the NewSeasonReleaseInterval feature, and the IsCurrentShow feature for the shows.

In lines 3-5, the variables $P_1$, $P_2$, and $P_3$ are determined. $P_1$ is based on the function WithNextUnseenEpisode (C|T|L). This function returns a result that indicates which shows in all categories have a next unseen episode for the user based on the user's watch history and the Availability feature. For $P_2$, the function WithoutNextUnseenEpisode(C) indicates which current shows C do not have a next unseen episode. This function uses the IsCurrentShow feature and the user's watch history to determine the result. For $P_3$, the function WithoutNextUnseenEpisode(L) indicates which library shows do not have a next unseen episode. This function uses the user's watch history and the IsCurrentShow feature to determine the result.

In line 6, a function GroupByCategory (SortByEffectiveTime ($P_1$)) groups the shows found in $P_1$ by category. The SortByEffectiveTime function first sorts the shows in each category by effective time based on $P_1$. Then, the function groups the ordered shows by category. Trailing and library shows may be treated as the same and the groups should not change the original order. As mentioned above, the shows in $P_1$ are shows that have at least one unseen episode.

In line 7, a FOR-loop makes a call to machine-learning predictor 506. Machine-learning predictor 506 can then perform ordering within the groups based on the watch history H and features of the shows.

In line 8, $Q_1$ may concatenate the sorted groups in G. For example, this forms a single list, since G is a group of lists, e.g., groups [[3, 4, 5], [2, 1], [7, 8]] are concatenated into [3, 4, 5, 2, 1, 7, 8], where the numbers are shows. In line 9, the shows in group $P_2$ are sorted based on the watch history H. Also, in $Q_3$ in line 10, the shows in $P_3$ are sorted based on watch history H. Lines 10 and 11 sort the shows with no unseen episodes after the shows with next unseen episodes. This puts the shows with no unseen episodes behind the shows with next unseen episodes. In line 11, the shows in $Q_1$, $Q_2$, and $Q_3$ are returned.

Machine Learning Predictor 506

Figure 7A:
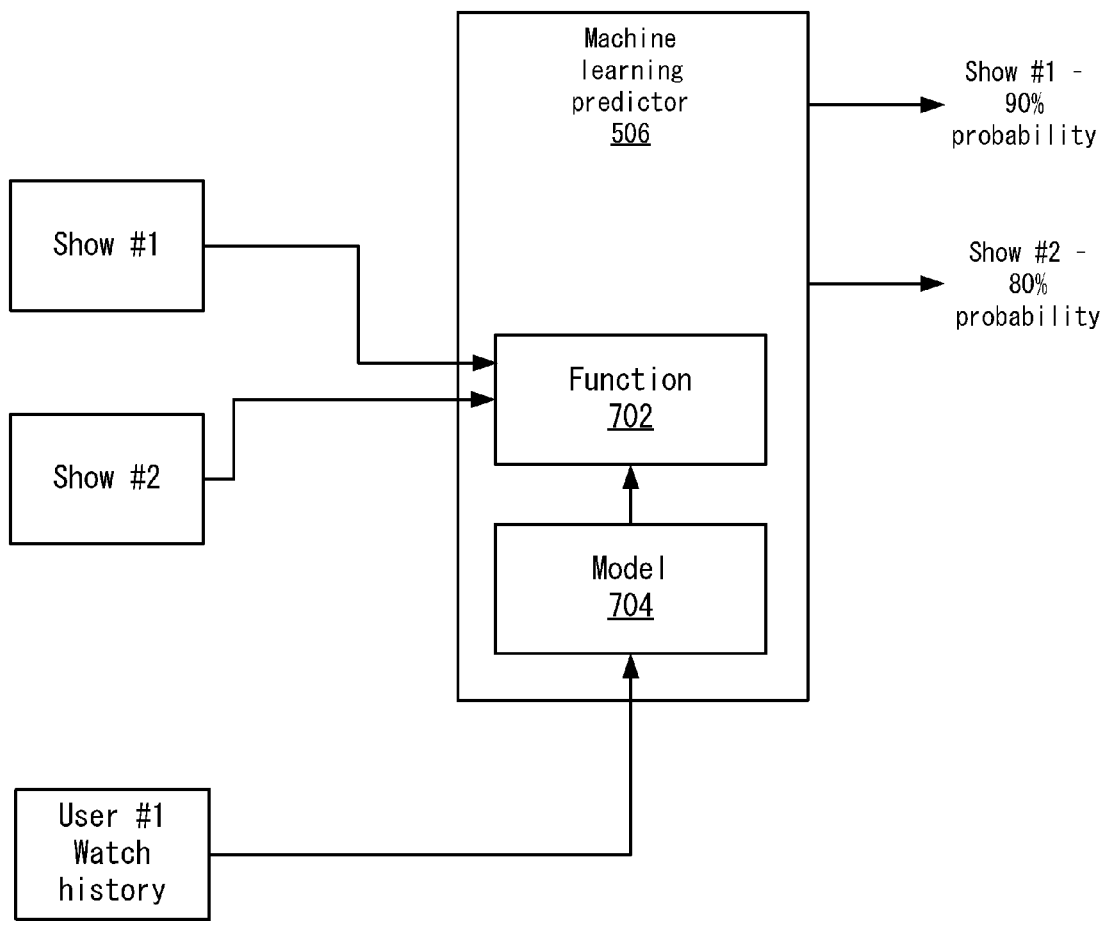
FIG. 7A shows an example of the machine-learning predictor according to one embodiment.

FIG. 7A shows an example of machine-learning predictor 506 according to one embodiment. Machine-learning predictor 506 receives an identification of a user #1 and also features from the user's watch history H. Also, two shows, show #1 and show #2, are used for this example. Machine-learning predictor 506 fits a function $f(u, s)$ 702, given a user's watch history H and show S, and returns a value within a range such that f(u, s) is consistent with the samples as much as possible. For example, a model 704 is trained using the user's watch history. The training process derives samples from implicit user feedbacks, such as video views and loads/clicks on the watch list, and explicit user feedback, such as a user affirmatively selecting one show over another. The model 704 is then built to predict a user's affinity to shows.

For user #1, machine-learning predictor 506 looks at the watch history for the user and creates two functions for a positive sample and a negative sample from the watch history for show #1 The same is performed for show #2. Machine-learning predictor 506 computes vectors using the attributes of user #1 and the shows that are derived from the feature values. Machine-learning predictor 506 then generates a value for the different combinations of different features. This outputs a value for show #1 and show #2. For example, machine-learning predictor 506 outputs a 90% probability for show #1 and an 80% probability for show #2. The probability is the probability that a user will select the show to watch.

Figure 7B:
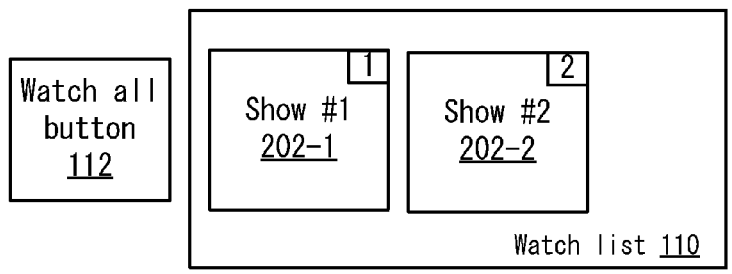
FIG. 7B shows the watch list after processing by the machine-learning predictor according to one embodiment.

FIG. 7B shows the watch list 110 after processing by machine-learning predictor 506 according to one embodiment. As shown, show #1 is shown in the first position and show #2 is shown in the second position. If "watch-all" button 112 is selected, unseen episodes for show #1 will be played and then unseen episodes for show #2. Once the user watches the unseen episodes for show #1, show #1 may be removed from the first position on the list and show #2 takes that position.

Dynamic Update of Watch List 110

Figure 8:
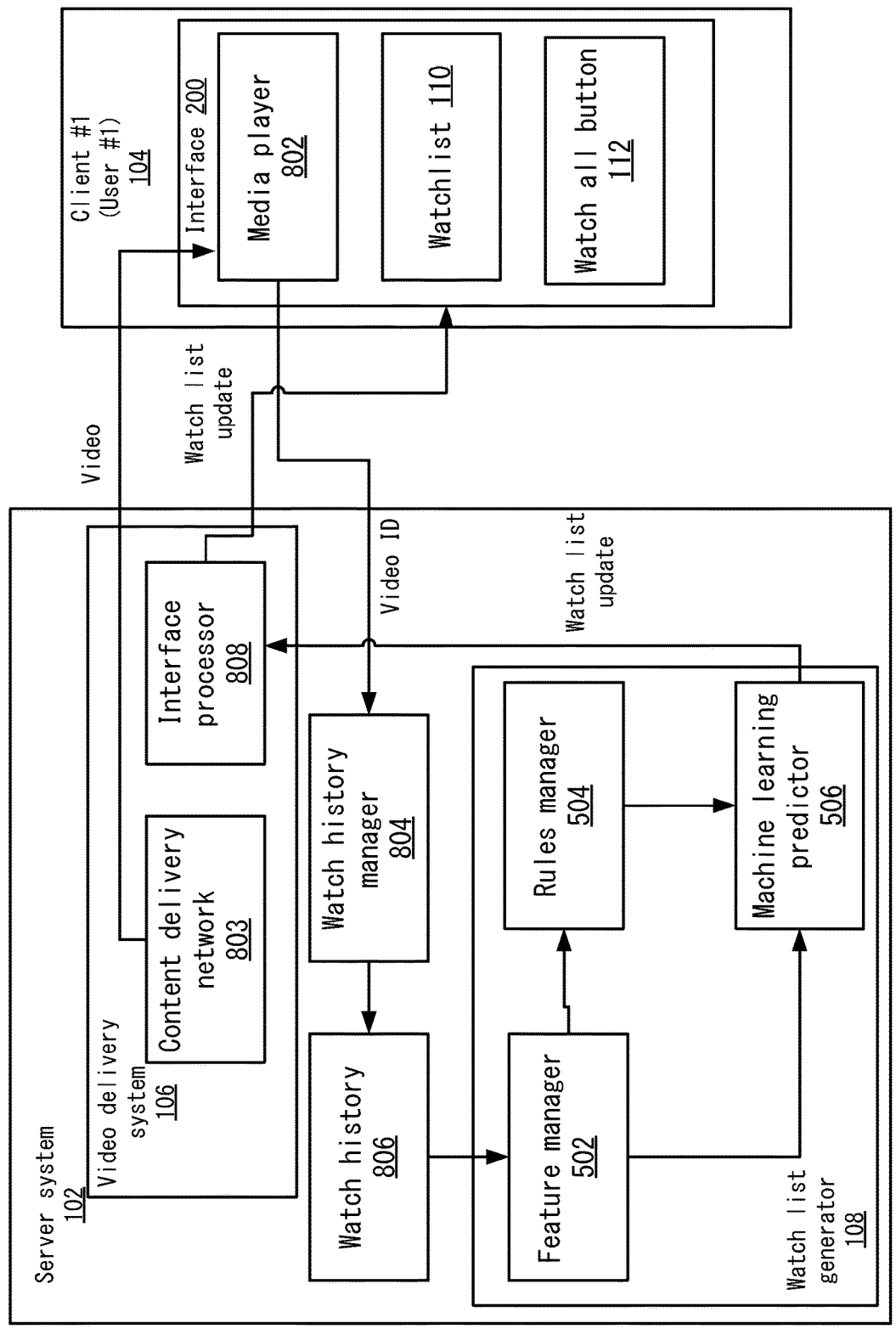
FIG. 8 depicts an example of dynamically updating the watch list according to one embodiment.

Watch list 110 needs to be dynamically updated for all users based on users watching videos. In this case, watch list generator 108 is integrated with video delivery system 106 to dynamically update user interfaces on client devices. FIG. 8 depicts an example of dynamically updating watch list 110 according to one embodiment. Watch list 110 must be updated dynamically to represent the current user's predicted order of watching shows. If watch list 110 is not dynamically updated, then watch all button 112 will not work correctly. This is because watch all button 112 is configured to play all unseen episodes of shows in the order of watch list 110. If a user watches an episode of a show and watch list 110 is not updated, then the predicted order in watch list 110 may not be accurate.

To provide dynamic updates, improvements to the operation of server system 102 are made by particular embodiments. This includes using a machine-learning predictor 506 that can predict the order of shows. Machine-learning predictor 506 can quickly update the predicted order in a way that a human cannot. Due to the many features that need to be taken into account, machine-learning predictor 506 can quickly predict the order for watch list 110 based on any changes to feature values or the watch history.

A content delivery network 803 for video delivery system 106 sends a video to a media player 802 on client device 104. It will be understood that content delivery network 803 may be separate from server system 102, that is, content delivery network 803 is operated by another company different from the video delivery service. Media player 802 may play the video. Also, client 104 includes a user interface 200 that can display videos offered by the video delivery service. The interface also displays watch list 110 and watch all button 112.

When the video is played, media player 802 may send a video identifier (ID) to server system 102. The video ID may identify what video has been played, such as an episode of a show has been played.

Watchlist generator 108 is integrated with video delivery system 106 to enable the dynamic updates. A watch history manager 804 receives the video ID and can update a user's watch history H at 806. The updated watch history H is then input into watch list generator 108. Feature manager 502, rules manager 504, and machine-learning predictor 506 then process the updated watch history H to generate an updated watch list 110. For example, the watch history may change values of some features. Also, rules manager 504 may change the categorization of the eligible shows and the order. For example, if a user watches an episode of a show and becomes caught up with that show, then the order may change. Machine-learning predictor 506 can then predict the order within the groups of shows.

Video delivery system 106 includes an interface processor 808 configured to update interface 200. Interface processor 808 communicates an update to watch list 110 to client 104. Once receiving the update, interface 200 dynamically updates watch list 110 on client device 104.

System Overview

Figure 9:
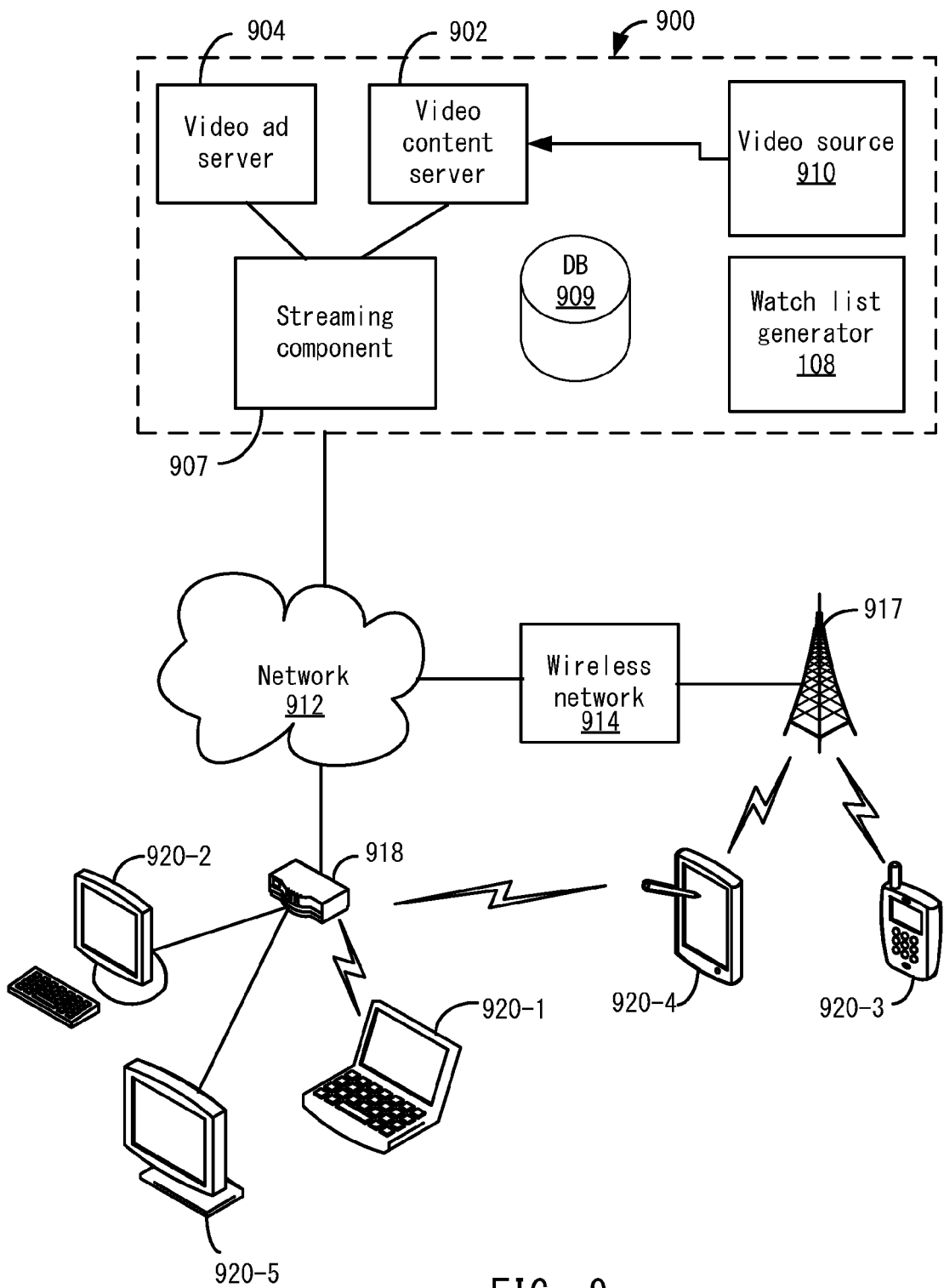
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 900, a public service message, or some other information. The video advertising server 904 may serve the video advertising segments as directed by a user interface controller (not shown).

The video streaming system 900 also may include watch list generator 108.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912 and/or other network 914. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for a wireless telephony network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HTTP and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
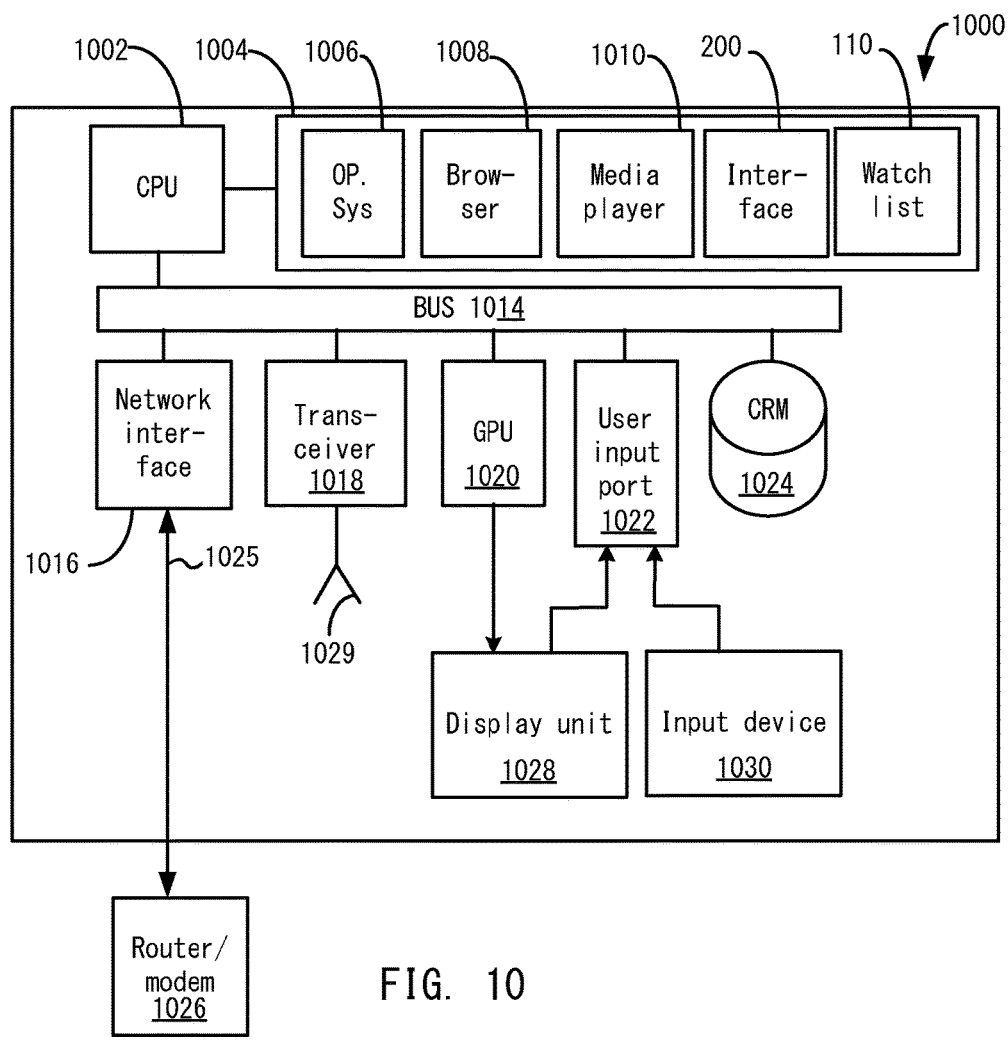
FIG. 10 depicts a diagrammatic view of an apparatus for viewing video content and the watch list.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The modules may further include modules to generate interface 200 and watch list 110. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules 1006, 1008, 1010 and 1012 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

storing, by a computing device, a watch history of shows for a user at a video delivery service that provides a service to send videos to a plurality of users, wherein the shows release recurring episodes in a season on the video delivery service;

training, by the computing device, a machine learning predictor to determine selection probabilities for shows using the watch history of shows, the selection probability indicating a prediction the user will select the show to watch;

receiving, by the computing device, a request for an episode of a show from a client device being used by the user;

updating, by the computing device, the watch history of shows with an indication the episode of the show was watched;

determining, by the computing device, a list of eligible shows for the watch list based on the updated watch history of shows for the user;

receiving, by the computing device, user specific features for the list of eligible shows based on the updated user's watch history, wherein the updated user's watch history is used to determine unseen released episodes for at least a portion of the list of eligible shows;

inputting, by the computing device, the user specific features and the list of eligible shows into the machine learning predictor to determine selection probabilities for each of the list of eligible shows, the selection probability indicating the prediction the user will select the show to watch and affected by a number of unseen released episodes for the show when the show has unseen released episodes; and dynamically updating, by the computing device, the watch list of shows for the user based on the selection probabilities of the list of eligible shows, wherein the watch list of shows orders the shows in an order in which the selection probability predicts that the user will select one or more of the list of eligible shows to watch.

2. The method of claim 1, further comprising:

outputting a watch all button configured to play the watch list of shows in the order without further user input; and upon receiving an input selecting the watch all button, causing unseen released episodes of the watch list of shows to be sent in the order without further user input.

3. The method of claim 2, wherein all unseen released episodes for a first show in the order are sent before unseen released episodes of a next show in the order are sent.

4. The method of claim 1, further comprising:

categorizing the at least a portion of the list of eligible shows into a plurality of categories based on a current status of unseen released episodes for shows in the list of eligible shows.

5. The method of claim 4, wherein the plurality of categories comprise:

a first category in which one or less unseen released episode has not been watched in a show that is releasing current episodes in a time period, a second category in which two or more unseen released episodes have not been watched in a show that is releasing current episodes in the time period, and a third category in which a show is not releasing current episodes in the time period.

6. The method of claim 4, further comprising:

determining an effective time for each show in the list of eligible shows, the effective time based on the category in the plurality of categories for each show.

7. The method of claim 6, further comprising:

pre-ordering the list of eligible shows by the effective time in a pre-order; and grouping shows in the pre-order based on respective categories in the plurality of categories of the shows.

8. The method of claim 7, further comprising:

using the machine learning predictor to order shows within each group.

9. The method of claim 4, further comprising:

using the machine learning predictor to order shows in the watch list using the effective time and a category in the plurality of categories for each show as input to the machine learning predictor.

10. A method comprising:

receiving, by a computing device, a watch history of shows for a user at a video delivery service that provides a service to send videos to a plurality of users, wherein the shows release recurring episodes in a season on the video delivery service;

determining, by the computing device, a list of eligible shows for a watch list based on the watch history of shows for the user;

categorizing, by the computing device, the list of eligible shows into a plurality of categories based on a current status of a number of unseen released episodes for shows in the list of eligible shows;

determining, by the computing device, an effective time for each show in the list of shows, the effective time based on the category for each show;

grouping, by the computing device, the list of shows into a plurality of groups based on the categories and the effective time for each show;

receiving, by the computing device, user specific features for the list of eligible shows based on the user's watch history;

for each group in the plurality of groups, inputting, by the computing device, the user specific features and the shows in a group into a machine learning predictor to determine a first order the shows in the group; and outputting, by the computing device, the watch list of shows in a second order based on the first order within the groups.

11. The method of claim 10, further comprising:

outputting a watch all button configured to play the watch list of shows in the second order without further user input; and upon receiving an input selecting the watch all button, causing unseen released episodes of the watch list of shows to be sent in the watch list order without further user input.

12. The method of claim 10, wherein the plurality of categories comprise:

a first category in which one or less next unseen released episode has not been watched in a show that is releasing current episodes in a time period, a second category in which two or more next unseen released episodes have not been watched in a show that is releasing current episodes in the time period, and a third category in which a show is not releasing current episodes in the time period.

13. The method of claim 12, further comprising:

ordering the list of eligible shows into a third order based on the effective time before performing the grouping, wherein the grouping is performed to group consecutive shows with a category considered to be of equal value.

14. The method of claim 13, wherein:

consecutive shows in the first category are grouped in first groups, and consecutive shows in the second category and third category are grouped in second groups.

15. The method of claim 14, wherein:

the machine learning predictor orders shows within each of the first groups and second groups.

16. The method of claim 10, wherein:

the effective time for the first category is a release time on the next unseen released episode, and the effective time for the second category and the third category is a watch time of a newest episode.

17. An apparatus comprising:

one or more computer processors; and a non-transitory computer-readable storage medium comprising instructions, that when executed, control the one or more computer processors to be configured for:

storing a watch history of shows for a user at a video delivery service that provides a service to send videos to a plurality of users, wherein the shows release recurring episodes in a season on the video delivery service;

training a machine learning predictor to determine selection probabilities for shows using the watch history of shows, the selection probability indicating a prediction the user will select the show to watch;

receiving a request for an episode of a show from a client device being used by the user;

updating the watch history of shows with an indication the episode of the show was watched;

determining a list of eligible shows for the watch list based on the updated watch history of shows for the user;

receiving user specific features for the list of eligible shows based on the updated user's watch history, wherein the updated user's watch history is used to determine unseen released episodes for at least a portion of the list of eligible shows;

inputting the user specific features and the list of eligible shows into the machine learning predictor to determine selection probabilities for each of the list of eligible shows, the selection probability indicating the prediction the user will select the show to watch and affected by a number of unseen released episodes for the show when the show has unseen released episodes; and dynamically updating the watch list of shows for the user based on the selection probabilities of the list of eligible shows, wherein the watch list of shows orders the shows in an order in which the selection probability predicts that the user will select one or more of the list of eligible shows to watch.

18. The apparatus of claim 17, further configured for:
outputting a watch all button configured to play the watch list of shows in the second order without further user input; and
upon receiving an input selecting the watch all button, causing unseen released episodes of the shows in the watch list of shows to be sent in the watch list order without further user input.

19. The apparatus of claim 17, further configured for:
categorizing the list of eligible shows into a plurality of categories based on a current status of unseen released episodes for the list of eligible shows.

20. The apparatus of claim 17, further configured for:
using the machine learning predictor to order shows in the watch list using the effective time and a category in the plurality of categories for each show as input to the machine learning predictor.

* * * * *